United States Patent
Smith et al.

(10) Patent No.: US 9,505,595 B1
(45) Date of Patent: Nov. 29, 2016

(54) RAPID DELIVERY PALLET JACK SYSTEM

(71) Applicants: James Nelson Smith, Raleigh, NC (US); Sean Timothy McCarthy, Locust, NC (US)

(72) Inventors: James Nelson Smith, Raleigh, NC (US); Sean Timothy McCarthy, Locust, NC (US)

( * ) Notice: Subject to any disclaimer, the term of this patent is extended or adjusted under 35 U.S.C. 154(b) by 0 days.

(21) Appl. No.: 14/934,214

(22) Filed: Nov. 6, 2015

(51) Int. Cl.
*B66F 9/075* (2006.01)
*B66F 9/065* (2006.01)

(52) U.S. Cl.
CPC .............. *B66F 9/075* (2013.01); *B66F 9/065* (2013.01)

(58) Field of Classification Search
CPC .......... B66F 9/12; B66F 9/122; B66F 9/127; B66F 9/08; B66F 9/065; B66F 9/19; B66F 9/195; B66F 9/075; B66F 9/07522; B66F 9/07559
USPC ........................................................ 280/43.12
See application file for complete search history.

(56) References Cited

U.S. PATENT DOCUMENTS

| | | | | |
|---|---|---|---|---|
| 2,570,726 A | * | 10/1951 | Smith | B66F 9/12 414/437 |
| 3,143,358 A | * | 8/1964 | Du Broff | B62B 3/0625 280/43.12 |
| 3,183,989 A | * | 5/1965 | Trusock | B62B 3/0612 180/13 |
| 3,486,648 A | * | 12/1969 | Dewald | B66F 9/19 298/17.5 |
| 3,581,923 A | * | 6/1971 | Archer | B66F 9/12 414/607 |
| 3,963,257 A | * | 6/1976 | Harron | B60P 1/027 280/43.12 |

(Continued)

*Primary Examiner* — John Walters
*Assistant Examiner* — Jacob Meyer
(74) *Attorney, Agent, or Firm* — Cranfill Summer & Hartzog, LLP

(57) ABSTRACT

This invention relates to a new pallet lift system for the movement of pallets via the use of a new pallet jack and dolly in conjunction with new tines to transport the pallet from one location to another and minimize the risk of damaging or marring the surface across which the pallet is moved by utilizing a pallet jack and a dolly equipped with soft wheels to allow a pallet to move over door thresholds and floor surfaces without risking damage to the surface, and to facilitate the transportation of pallets of merchandise across an uneven surface such as a parking lot, and into and through a narrow entrance such as a standard doorway and provides a method to load pallets in and out of trucks with the narrow edge leading, thus increasing the usable space inside a typical truck, the present invention being able to be used with multiple different sized pallets.

8 Claims, 4 Drawing Sheets

(56) References Cited

U.S. PATENT DOCUMENTS

| | | | | |
|---|---|---|---|---|
| 3,966,067 | A * | 6/1976 | Reese | B60T 11/103<br>180/53.4 |
| 4,166,638 | A * | 9/1979 | De Prado | B62B 5/0083<br>280/638 |
| 4,213,624 | A * | 7/1980 | Sanders | B62B 3/0606<br>280/43.12 |
| 4,712,966 | A * | 12/1987 | Gross | B60P 3/41<br>108/55.3 |
| 4,884,936 | A * | 12/1989 | Kawada | B62B 3/04<br>280/43.12 |
| 4,969,794 | A * | 11/1990 | Larsen | B62B 3/0618<br>280/43.12 |
| 5,161,933 | A * | 11/1992 | Stauber | B62B 3/04<br>280/43.12 |
| 5,221,176 | A * | 6/1993 | Allen | B66F 9/12<br>414/607 |
| 5,556,118 | A * | 9/1996 | Kern | B62B 3/00<br>280/47.16 |
| 5,709,397 | A * | 1/1998 | Hall | B62B 1/22<br>280/47.17 |
| 5,716,061 | A * | 2/1998 | Sloan | B66F 5/02<br>254/131 |
| 6,079,941 | A * | 6/2000 | Lee | B62B 3/04<br>16/35 R |
| 6,125,971 | A * | 10/2000 | Niebuhr | B66F 9/07504<br>187/222 |
| 6,283,698 | B1 * | 9/2001 | Lee | B62B 3/04<br>414/537 |
| 6,488,304 | B2 * | 12/2002 | Krawczyk | B62B 1/002<br>280/408 |
| 6,540,241 | B2 * | 4/2003 | Lee | B62D 21/14<br>254/2 C |
| 7,744,335 | B1 * | 6/2010 | Cleary | B60L 1/003<br>187/226 |
| 8,475,109 | B2 * | 7/2013 | Torrison | B62B 3/008<br>280/47.2 |
| 8,540,253 | B2 * | 9/2013 | Rath | B66F 9/07586<br>187/222 |
| 8,668,208 | B2 * | 3/2014 | Larringan Errasti | B62B 3/06<br>280/43 |
| 8,950,759 | B2 * | 2/2015 | Thorsen | B62B 3/02<br>280/43.12 |
| 9,045,321 | B2 * | 6/2015 | Ford | B66F 9/07513 |
| 9,078,967 | B2 * | 7/2015 | Oerter | A61M 1/1656 |
| 9,260,125 | B2 * | 2/2016 | Ellington | B62B 3/06 |
| 9,415,984 | B1 * | 8/2016 | Shinosky, Jr. | B66F 9/12 |
| 2003/0190222 | A1 * | 10/2003 | Riggin | B62B 3/02<br>414/540 |
| 2006/0182578 | A1 * | 8/2006 | Morton | B62B 3/04<br>414/537 |
| 2006/0232030 | A1 * | 10/2006 | Passeri | B62B 3/008<br>280/43.12 |
| 2008/0181760 | A1 * | 7/2008 | Frahm | B62B 3/06<br>414/785 |
| 2009/0020369 | A1 * | 1/2009 | Warachka | B66F 9/12<br>187/231 |
| 2010/0061834 | A1 * | 3/2010 | Weich | B62B 3/06<br>414/489 |
| 2014/0010622 | A1 * | 1/2014 | Mizner | B60P 1/4421<br>414/634 |
| 2014/0166951 | A1 * | 6/2014 | Mariotti | B62B 3/0631<br>254/2 R |
| 2014/0175350 | A1 * | 6/2014 | Mariotti | B62B 3/0631<br>254/2 R |
| 2014/0175351 | A1 * | 6/2014 | Mariotti | B62B 3/0631<br>254/2 R |
| 2015/0225218 | A1 * | 8/2015 | Strand | B66F 9/065<br>701/50 |
| 2015/0336781 | A1 * | 11/2015 | Neubauer | B66F 9/22<br>254/2 R |
| 2015/0368081 | A1 * | 12/2015 | van Seumeren | B66F 9/12<br>187/237 |
| 2016/0060084 | A1 * | 3/2016 | Baudermann | B66F 7/0625<br>414/347 |
| 2016/0101794 | A1 * | 4/2016 | Fowler | B66F 9/18<br>254/2 R |

* cited by examiner

RAPID DELIVERY PALLET JACK SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

FIELD OF THE INVENTION

This invention relates to the field of transportation and delivery. More specifically, this invention relates to the transportation and trucking industry. Still more specifically, this invention relates to the transportation of goods via pallets. This invention relates to the movement of pallets via a dolly in order to deliver goods stacked upon the pallet to the desired location. Particularly, this invention relates to the use of a dolly in conjunction with lift jack tines to raise a standard pallet off the surface of the ground in order to facilitate transport of the pallet from one location to another. More particularly this invention relates to the use of a dolly equipped with non-marking wheels to allow a pallet to move over door thresholds and floor surfaces without risking damage to the surface. In particular, this invention relates to a dolly and tine combination used on a lift jack to facilitate the transportation of pallets of merchandise into a retail establishment without causing damage to the surface or floor where the pallet is transported. It further relates to moving a pallet across an uneven surface such as a parking lot, and into and through a narrow entrance such as a standard doorway. Still further, the present invention provides a method to load pallets in and out of trucks with the narrow edge leading, thus increasing the usable space inside a typical truck. The present invention can be used with multiple different sized pallets.

BACKGROUND OF THE INVENTION

Almost every product that is sold shares one important feature. It must be transported from the place of manufacture and delivered to the ultimate consumer or user. Most of the transportation of goods is accomplished by transporting the goods in bulk. Whether the goods are shipped via ground, air, or sea, they are typically packaged together for ease of transportation.

Often goods are packaged together on supporting structures called pallets. These pallets are usually made of wood, however, as manufacturing technology has improved and the cost of plastic has come down, manufacturers are now making some pallets out of plastic. The pallet is designed to accomplish several objectives, one of which is to support the weight of the packaged goods. The pallet is designed to include supporting elements that allow a heavy load to rest on top of the pallet. Typically a pallet is designed to have hollow spaces between a top deck and a bottom deck. The top deck is provided such that the goods or merchandise can be stacked on the top deck of the pallet in large quantities. The bottom deck of the pallet is designed to sit on the ground, the floor of a warehouse, or the floor of a transport vehicle. In addition to being able to support the weight of the load, the pallet must provide a stable platform upon which to rest the packaged goods. This is important as it is desirable to minimize potential movement of the load during transport. Due to the strength of pallets, goods can be packaged together and place upon a pallet despite being quite heavy. Typically mechanical assistance is required to lift the packaged load onto and off of the pallet.

In addition to possessing the ability to support a heavy load, pallets are designed to allow the use of mechanical devices to assist in moving and transporting the pallet and goods from one location to another. Pallets typically have one or more places built into their structure that will accept a tine from a forklift, jack, or other lifting device. This allows the stack of goods and the pallet to be easily moved by a forklift from one place to another. Theses indentations or slots are usually raised up to about two inches from the bottom surface of the pallet so the tines from a forklift can fit underneath the pallet, sliding in from one side toward the other through the hollow space. Once the tines are slid into the pallet hollow space, they are raised to engage contact points on the pallet. Thus, the forklift tines can exert lifting force on multiple areas of the pallet giving the tines more surface area on which to exert a lifting force.

Pallets are typically the structural support for goods as they are moved from one location to another. Use of pallets is highly efficient and has proven to be a very effective method to transport goods, merchandise, heavy machinery, and other large, heavy objects. However, there are drawbacks to the use of pallets. Thus, a need has arisen for improved pallets and transportation mechanisms designed to allow one to easily move heavy pallets from place to place. This includes moving a pallet from a truck into a store.

A recurring problem with the current state of the art regarding pallets and pallet jacks, or dollies, is that the pallet jack typically uses hard plastic or metal wheels. The hard plastic or metal wheels are designed to be used on hard, smooth concrete floors, such as that found in warehouses. These wheels cause damage to retail floor surfaces such as tile when they move across it due to the large weight of the pallet. The hard and small diameter wheels do not roll well on uneven surfaces such as parking lots and sidewalks, nor do they easily roll over door thresholds into and out of retail establishments.

Since a pallet is designed to support a large amount of weight, that weight must in turn be supported by whatever apparatus is used to move the pallet. In most cases, the pallet jack has a number of wheels that allow it to move once the pallet is contacted and raised. In particular, the lift wheels that are typically in the tines must be small in order to fit in the tine. When the lift is operated so that the tines are raised, the lift typically both raises the tines and lowers the lift wheels such that the pallet is supported by the lift wheels near the front of the pallet and the lift wheels behind the hydraulic lift.

The wheels on standard pallet jacks are designed to support heavy loads, but they are also typically small and placed at various locations on the pallet jack. The force exerted on the wheels is a result of a heavy pallet concentrating all its weight and the weight of the load that it is supporting onto several small wheels. While the wheels allow the pallet jack to move the pallet, rolling underneath as the pallet jack is moved, the wheels can damage the floor surface simply due to the large amount of weight exerted by the pallet and load down to the surface through the wheels. The small contact patch of the wheel to the floor must support a large amount of weight through a typically very small surface area. This can lead to damage to the surface due to excess weight being applied to a small surface area. Also, this small surface area makes it difficult to push the pallet jack across parking lots, sidewalks, and over door thresholds, or any area where the surface is uneven. This is especially true when the floor surface is soft or is made of material that is flexible. On the other hand, if the floor material is made of a very hard surface such as stone tile, the weight of the pallet concentrated on a small wheel can mar or otherwise damage the surface. The small surface area of the wheel that contacts the floor has a tremendous amount of weight to support, and that weight passes force through the wheel and directly onto the floor. Repeated transport of a pallet jack supporting a heavy load over a surface can cause damage to the surface resulting in unsightly marks, cracks, or even holes. Therefore there is a need for a pallet jack that will minimize the risk of causing damage to surfaces when a heavily laden pallet is passed over the surface by means of a pallet jack.

While the prior art has attempted to address the issues described above, there remain several significant and important problems with the available options in the prior art. An important limitation to the prior art is the rate at which mechanical failures occur in the devices designed to raise and move a pallet. This problem has led to a large segment of the market looking for new and novel solutions to the problem. An early attempt to solve these problems was to use custom pallets. However, while the use of a custom pallet may aid in the transport of the load, the custom pallet must still be raised by a pallet lift and transported by a pallet lift using the standard wheels. Further, achieving a successful transition to custom pallets is frustrated by the wear on the custom pallet. Typically, custom pallets are higher than a standard pallet, and the feet of the custom pallet, that part that contacts the ground, tend to flex over time, especially when the pallet is supporting an abnormally heavy load. Further, custom pallets must be manufactured and are not widely used. In contrast, there are a huge number of standard, wooden pallets already in existence, and a device and method that would solve these problems while still using a standard pallet is desirable.

Another issue with the use of a custom pallet is the corresponding need to use a custom lift apparatus. If the custom pallet differs from a standard pallet in any significant dimensions, a standard lift dolly or pallet jack will not necessarily fit under the pallet. Thus, if one is unable to use a standard dolly to lift and move a custom pallet, one would need to possess a special dolly for each kind of pallet one encounters. Since pallets are routinely reused and reloaded, this may prove difficult and limits the applicability and usefulness of a custom pallet.

In addition to being an onsite issue, the use of a custom pallet and an associated pallet jack will further drive up the costs for the end user. Further, the issues related to the custom pallets and custom dolly apparatuses have the potential to create reliability problems in the future. Thus, continued use of the standard pallet is desirable, if a solution to the problems associated with the standard pallet can be addressed and solved.

Another difficulty and problem associated with the use of standard pallets and pallet jacks is that it is often difficult to maneuver the pallet jack in and out of narrow doorways without damaging the surface or doorway. As a result of the ease of which pallets are used to transport goods, many devices are manufactured to aid in the movement of pallets. Such devices include forklifts, pallet jacks, and other mechanical apparatus designed specifically to interact with standard, wooden pallets. As a result, most pallets are of a standard size, which in the United States is 40 inches by 48 inches. As pallets are designed to hold large amounts of goods, it is desirable to make them as large a practical in order to move as much merchandise as possible. To this end, several different sizes of pallets have been developed. Specifically, pallets are now made in 33"×39", 32"×40", 24"×40", and some, designed for use with single tine jacks, are smaller than 24 inches wide.

Moving a large or heavy pallet requires care when moving through a narrow doorway or store aisles. A problem with the current state of the art with pallet jacks is that they are difficult to move through narrow passageways due to the size of the wheels. The small, lift wheels make it difficult to turn the pallet jacks on a small turning radius and require more force to turn. Thus, there is a need for a pallet jack that is easy to move and turn with a small radius, making it easier to maneuver in small areas and through narrow doorways and aisles.

DESCRIPTION OF RELATED ART INCLUDING INFORMATION DISCLOSED UNDER 37 CFR 1.97 AND 1.98

Several options for pallets and devices to move pallets are currently available for use. Several companies and inventors have created devices by which a pallet is moved into a retail establishment. Once such device is embodied in U.S. Pat. No. 8,776,697 to O'Connell.

The '697 patent claims a solution for maneuverability involving a custom designed pallet made of plastic. This pallet device is specifically designed to allow goods to be moved into narrow doorways and to be easily maneuvered through tight spaces. The pallet system is based on two components, a custom pallet and a corresponding custom pallet jack. The pallet and its design have evolved over time. The custom pallet is a narrow, plastic pallet that is approximately 18" wide with various lengths available. As is clear from the '697 specification and drawings, the pallet described in the '697 patent is a custom pallet of odd shape and size, significantly narrower than the standard 40 inch pallet. The corresponding pallet jack, designed to run off $CO_2$, is also a custom shape designed to fit the particular shape of the custom pallet. A problem with this solution is that it requires the use of a custom pallet and custom pallet jack, and thereby suffers from the same problems discussed earlier. Moreover, the custom pallet jack required by the '697 pallet is useless on a standard pallet. Thus, any transport of goods that are resting on a standard pallet must be accomplished with a standard pallet jack, or the goods must be transferred to the custom pallet prior to moving the goods into a retail establishment. This would require the use of at least two, different pallet jacks, one that is a standard pallet jack and one that is the custom pallet jack required by the '697 patent. This is not practical, and the need exists for a device that overcomes these issues.

Therefore, a need exists for a device that allows one to easily move a standard pallet in and out of a retail establishment without damaging the floor, doorjamb, or other obstacle encountered on the route. The present invention overcomes the limitations and problems with the prior art and provides a novel solution to these problems.

BRIEF SUMMARY OF THE INVENTION

The present invention is a device designed to overcome the problems in the prior art and specifically to improve the efficiency of unloading a truck and transporting small pallets into a store or warehouse. Although the present invention can be used on full size pallets, it is particularly designed to transport smaller width pallets through a doorway which may be as small as thirty inches wide. In a preferred embodiment, the invention is designed to handle twenty-four inch wide pallets. However, it should be readily appreciated by those skilled in the art that the present invention is not limited to use with twenty-four inch wide pallets. While the preferred embodiment of the present invention has two pallet forks, those skilled in the art can readily appreciate that the invention can easily be modified to work with a single fork pallet truck for pallets less than 24" wide. Further, the length of the forks can be modified to fit varying lengths of pallets from 24-48 inches, or to whatever length is desired. In addition, it should be appreciated that the invention can be modified to be manually operated or powered. Thus the invention may be configured to run under a power source or configured such that the operator pushes to move the device.

There are several aspects of this invention that when combined provide an apparatus that allows for the transport of pallets from a truck, across an uneven surface such as a parking lot or door threshold, and into a store or warehouse. Among the unique features of the present invention is that use of turning wheels that are constructed from soft rubber to facilitate rolling the pallet truck with ease. Further, a novel dolly is used with the pallet jack tines and may include a handle for ease of movement and convenience. Like the jack, the dolly is constructed to use soft rubber wheels. The combination of these wheels, two on the dolly and the main wheels on the lift, eliminate the need to use the lift wheels contained within the tines for transporting the pallet. Thus, the lift wheels are only needed to lift the pallet to a height where the dolly can be attached. This use of the dolly and main jack wheels only makes it very easy to push the pallet jack. It also eliminates most of the risk of marring or damaging the surface upon which the pallet jack is moved.

Additionally, in a preferred embodiment there is provided a manual lift, such as a hydraulic cylinder, electric screw drive or other conventional powered unit, mounted on the pallet jack which serves to raise the lifting wheels once the dolly is attached. In a preferred embodiment, the manual lift is a hydraulic lift that an operator engages to retract the lift wheels back into the tine. The pallet jack handle typically raises the tines and lowers the lift wheels at the same time so that raising the laden pallet is done uniformly and reduces the risk of becoming unbalanced and tipping. Once the pallet is raised off the floor to the proper elevation, the dolly is slid into position on the ends of the pallet jack tines. At this point the operator engages the manual lift and retracts the lift wheels into the tines which transfers the weight of the laden pallet to the dolly.

One of the most beneficial aspects of the present invention is that it allows for the use of smaller width pallets which in turn allows for more pallet storage in a standard rear loaded truck. In its preferred embodiment, the present invention is designed to use a standard 24×40 inch pallet. Using a pallet that is 24 inches wide allows one to stack four pallet across the width in a typical 102 inch wide truck. Thus, the present invention allows use of 96 inches of the available 102 inches in a standard truck. The result is that one can load more product on a standard truck by utilizing the 24 inch pallet and the present invention.

Another benefit of the present invention is the ability for the distributor to use a more efficient method of moving the trucked merchandise from the delivery truck into the retail establishment. Use of the present invention reduces the time it takes a driver time to unload a truck. With the current state of the art devices and larger pallets, a distributor utilizes either a bulk rear loaded truck or a side loader. A bulk truck bed may vary in width or length but it is typically 53 feet long and 102 inches wide. The trucks typically have a rear lift gate so pallets can be unloaded from the truck at the rear and the lift gate can raise and lower the heavily laden pallets. Some trucks also have one or more bays on the side.

With either a truck that has only a rear bay or a truck that has a rear and side bay, standard pallets are typically loaded into the truck from the rear. Where the truck has only a rear bay, once a driver reaches a delivery location, the driver will enter the rear of the truck to begin the process of unloading the merchandise from the truck. The driver will use a traditional pallet jack to move the pallets from the truck to the lift gate in order to lower himself and the pallet to ground level. Once the pallet is lowered to ground level, the driver will load as much merchandise from the pallet onto a hand truck. Once the hand truck is filled with merchandise, either stacked to the height limit of the hand truck or stacked to the maximum weight the driver can safely support, the driver will manually push the hand truck thereby transporting the merchandise cases into the delivery location. This typically also requires that the driver manually push the loaded hand trucks through a standard door opening. In order to transport the full load destined for the delivery location, a driver will often be required to make multiple trips from the pallet into to the establishment, depending on how much merchandise can fit on the hand trucks. Thus there is a need to streamline this process to allow the driver to make as few trips as possible and maximize the amount of merchandise that can be moved into the delivery location per trip.

The operation of unloading and delivering merchandise is similar with the trucks that have side bays. However, the driver does not have a lift gate to aid in lowering a heavily laden pallet to the ground prior to unloading. When the truck only has a side bay, the driver must raise the sliding door for each bay to be unloaded. The driver must reach up into the side bay, typically somewhere between 24 and 60 inches above the ground and manually unstack the merchandise from the loaded pallet and onto the hand truck. Not only is this an ergonomic issue that could lead to injury for the driver, but it is also very time consuming.

The present invention addresses these concerns by providing an easier method to unload a truck. Once a distribution company begins to use the present invention, it will quickly see that it can eliminate the use of side loaded trucks and replace them with rear loaded trucks that have lift gates. Use of the present invention will facilitate the efficient offloading of merchandise from the rear loaded truck and decrease the amount of time it takes to move merchandise from the truck into the delivery destination. Further, the present invention can aid in reducing the potential for injury to a driver caused by the repeated moving of product from the pallets to a hand truck.

One method currently used in the art to move product or merchandise into a delivery location from a delivery truck is to use carts. There are several problems with this method that the present invention will overcome. First, carts are expensive to purchase and maintain. Second, a cart cannot be stacked or turned on its side and moved out of the way like a pallet can. Therefore the driver must constantly move the cart around as he is unloading his truck. Third, a conventional cart is not conducive to automation. While a pallet can be run on an automated case picking system, a typical cart cannot. Thus, there are numerous problems inherent in the use of a cart to aid a driver in delivering merchandise into a delivery destination.

Another object of the present invention is to solve the problems of the prior art by providing a reliable pallet jack device that can be used to move a conventional wood or plastic pallet. The invention utilizes a novel tine on a standard pallet jack combined with a novel dolly type attachment that fits on the end of the tines on the pallet jack. The invention incorporates inventive features that result in a device that can roll into a small retail environment without damaging the surface across which it is moved. Another object of the present invention is to provide a pallet jack apparatus that can transport a standard pallet and a smaller pallet designed specifically to be used in and out of a standard 30 inch doorway found in most retail establishments. A still further object of the present invention is to provide a pallet jack that can roll over a door threshold, doorjamb, or other surfaces, including softer, tile floors typically found in retail establishments without damaging the surface or leaving marring or other unsightly marks. A further object of the present invention is to provide a method where a novel pallet jack is used to transport a pallet of merchandise into a retail establishment without damaging the floors.

In a preferred embodiment of the present invention, the invention is a pallet lift system that includes a pallet jack and a dolly wherein the pallet jack has a tine support that affixed to one or more tines. The tine is affixed to the tine support at one end of the tine and the other end of the tine is configured to form a dolly support. The dolly support protrudes from the end of the tine that is opposite to the end attached to the tine support. Also, the tine is manufactured such that there is a hole or cavity located in the tine near the end that forms the dolly support. The cavity is made so that it will hold a lift wheel system. The lift wheel system is a conventional system that is affixed in movable relation to the tine and housed in the cavity such that it can extend down from within the tine, housed in the cavity, to contact the surface or ground. Once the lift wheel system contacts the surface, it can continue extending thereby raising the tine.

The pallet lift system utilizes a pallet jack that also includes a handle. The handle is configured to operate both the lift wheel system and it is secured to a conventional hydraulic system. The conventional hydraulic system is affixed to the tine support and the handle operates both the conventional hydraulic system and the lift wheel system to lift and lower the tine and tine support. This allows the pallet jack to raise and lower the tines, thereby raising and lowering the pallet. The pallet jack also departs from the conventional pallet jacks by utilizing soft wheels. The soft wheels are connected to the conventional hydraulic system such that the pallet jack is supported by the soft wheels on one end and the lift wheel system on the opposite end. The soft wheels are capable of supporting fully loaded pallets, but are manufactured from material that will not damage or mar floors when the pallet jack passes over their surface.

The present invention further contemplates using a new and novel dolly in connection with the new and novel pallet jack. The dolly has a base and one or more receptors affixed to the base. The receptor is shaped to form a cavity wherein the dolly support on the end of the tine can fit. The dolly support fits in the receptor so that the load from the end of the tine can be transferred from the lift wheel system to the dolly. Like the pallet jack, the dolly is equipped with soft wheels. The soft wheels are affixed to the base of the dolly and are capable of supporting the weight of a fully loaded pallet, but are manufactured from material that will not damage or mar floors. In a preferred embodiment, the soft wheels on the pallet jack are the same as the soft wheels on the dolly.

As can be readily appreciated by those skilled in the art, the pallet jack and dolly can have any number of additional features to aid in their use and broaden their applications. Once such addition is the inclusion of a dolly handle attached to the base of the dolly. This will aid a user in moving and handling the dolly, and make it easier to transport the dolly from one location to the next. Also, the dolly can be equipped with a hand-screw penetrating through the top of the receptor. The hand screw, or other type of fastener, would be configured to engage and secure the dolly to the dolly support on the tine. It is contemplated that the dolly support on the tine would be configured to have a matching hole or attachment point for the screw. This will secure the dolly to the tine and ensure that the dolly cannot slip off while in use.

Another addition that will facilitate the ease of use of the present invention is a manual lift affixed to the tine support and configured to operate the lift wheel system. The manual lift, which can be any type of conventional configuration, in a preferred embodiment a hydraulic lift, is used to raise the lift wheel system once the lift wheel system is no longer under load. Thus, once an operator uses the handle to lower the tine after attaching the dolly and the weight of the pallet is now on the soft wheels of the pallet jack and the soft wheels of the dolly, the operator uses the manual lift to raise the lift wheel system back up into the cavity and out of the way. Thus, the entire weight of the pallet, pallet jack, and dolly rests on soft wheels, and will not damage or mar any surface on which it passes.

In addition to these additions, the pallet jack can further accommodate a block affixed to the end of the tine and abutting the tine support. This block, or other obstruction, can be sized and configured such that the block stops the insertion of the tine into the pallet by contacting the pallet at a predetermined distance. Thus, the movement of a pallet when slid onto the tines is arrested at a specific location, thereby positioning the pallet at the ideal location on the tine. It should also be appreciated by those skilled in the art that the present invention can be configured to use a plurality of receptors and tines. Also, the present invention can be modified to use specially sized pallets by altering the dimensions of the tines, dolly, wheels or any other feature in the present invention.

The present invention further contemplates a new a novel method of moving laden pallets from a delivery truck to a delivery destination. This method involves orienting a loaded pallet on a truck such that the loaded pallet can be accessed by a pallet jack. The loaded pallet can be oriented in any number of ways as long as there is the ability to access the pallet with the pallet jack. The pallet jack used in this method has a tine support, that is affixed to one or more tines. The tine is affixed to the tine support at one end of the tine and the other end of the tine is configured to form a dolly support. The dolly support protrudes from the end of the tine that is opposite to the end attached to the tine support. Also, the tine is manufactured such that there is a hole or cavity located in the tine near the end that forms the dolly support. The cavity is made so that it will hold a lift wheel system. The lift wheel system is a conventional system that is affixed in movable relation to the tine and housed in the cavity such that it can extend down from within the tine, housed in the cavity, to contact the surface or ground. Once the lift wheel system contacts the surface, it can continue extending thereby raising the tine. The pallet jack also includes a handle configured to operate both the lift wheel system and a conventional hydraulic system. The conventional hydraulic system is affixed to the tine support and the handle operates both the conventional hydraulic system and the lift wheel system to lift and lower the tine and tine support. This allows the pallet jack to raise and lower the tines, thereby raising and lowering the pallet. The pallet jack also departs from the conventional pallet jacks by utilizing soft wheels. The soft wheels are connected to the conventional hydraulic system such that the pallet jack is supported by the soft wheels on one end and the lift wheel system on the opposite end. The soft wheels are capable of supporting fully loaded pallets, but are manufactured from material that will not damage or mar floors when the pallet jack passes over their surface.

The method of the present invention further contemplates using a new and novel dolly in connection with the new and novel pallet jack. The dolly has a base and one or more receptors affixed to the base. The receptor is shaped to form a cavity wherein the dolly support on the end of the tine can fit. The dolly support fits in the receptor so that the load from the end of the tine can be transferred from the lift wheel system to the dolly. Like the pallet jack, the dolly is equipped with soft wheels. The soft wheels are affixed to the base of the dolly and are capable of supporting the weight of a fully loaded pallet, but are manufactured from material that will not damage or mar floors. In a preferred embodiment, the soft wheels on the pallet jack are the same as the soft wheels on the dolly.

The method further includes retrieving the pallet jack and inserting its tines into the pallet to be moved such that the pallet is in a position such that the dolly support on the tine protrudes from the pallet on the opposite side from the pallet jack. Another step in the method is operating the handle to raise the tines and lower the lift wheel system such that the pallet is raised off the surface of the truck or the ground. The next step is moving the pallet jack and pallet so that there is access to the back of the pallet where the dolly support protrudes from the pallet. Once the rear of the pallet is accessible and, specifically the dolly support is accessible, retrieving a dolly to attach to the dolly support. The dolly having a base, a receptor affixed to the base forming a receptor cavity configured to accept the dolly support. Also, the dolly must have soft wheels affixed to the base such that the soft wheels are capable of supporting a fully loaded pallet but manufactured from material that will not damage or mar floors or other surfaces when moved.

Once the dolly support is accessible, the next step is attaching the dolly to the dolly support. Once attached, the next step is operating the handle to lower the tine and raise the lift wheel system so that the weight of the loaded pallet rests on the soft wheels of the pallet jack and the soft wheels of the dolly. The next step is moving the pallet jack loaded with the pallet from the truck into a delivery location. Once the pallet is in the desired location in the delivery locations, the operator operates the handle to lower the tine and raise the lift wheel system to remove the weight from the dolly and put it back on the lift wheel system. Once the weight is on the lift wheel system and off the dolly, removing the dolly from the dolly support is the next step. Finally, operating the handle to lower the tine and raise the lift wheel system transfers the weight of the loaded pallet onto the floor or surface and off of the tine so the pallet jack can be removed from the pallet.

It should be appreciated by those skilled in the art that there are additional steps that an operator can use to make full use of the present invention. For example, one can utilize the step of operating a manual lift to raise the lift wheel system once the dolly is attached to the dolly support. Also, the method can be adjusted to allow the step of inserting the tines of the pallet jack under the loaded pallet until the pallet comes into contact with a stop block affixed to the tines. This allows one to place the loaded pallet in a precise location on the pallet jack.

Still further objectives and advantages to the present invention will become apparent to those skilled in the art from consideration of the following figures and detailed description of a preferred embodiment of the invention.

BRIEF DESCRIPTION OF THE SEVERAL VIEWS OF THE DRAWING(S)

A preferred embodiment of the present invention is represented in FIGS. 1 through 4.

DETAILED DESCRIPTION OF THE INVENTION

Figure 1:
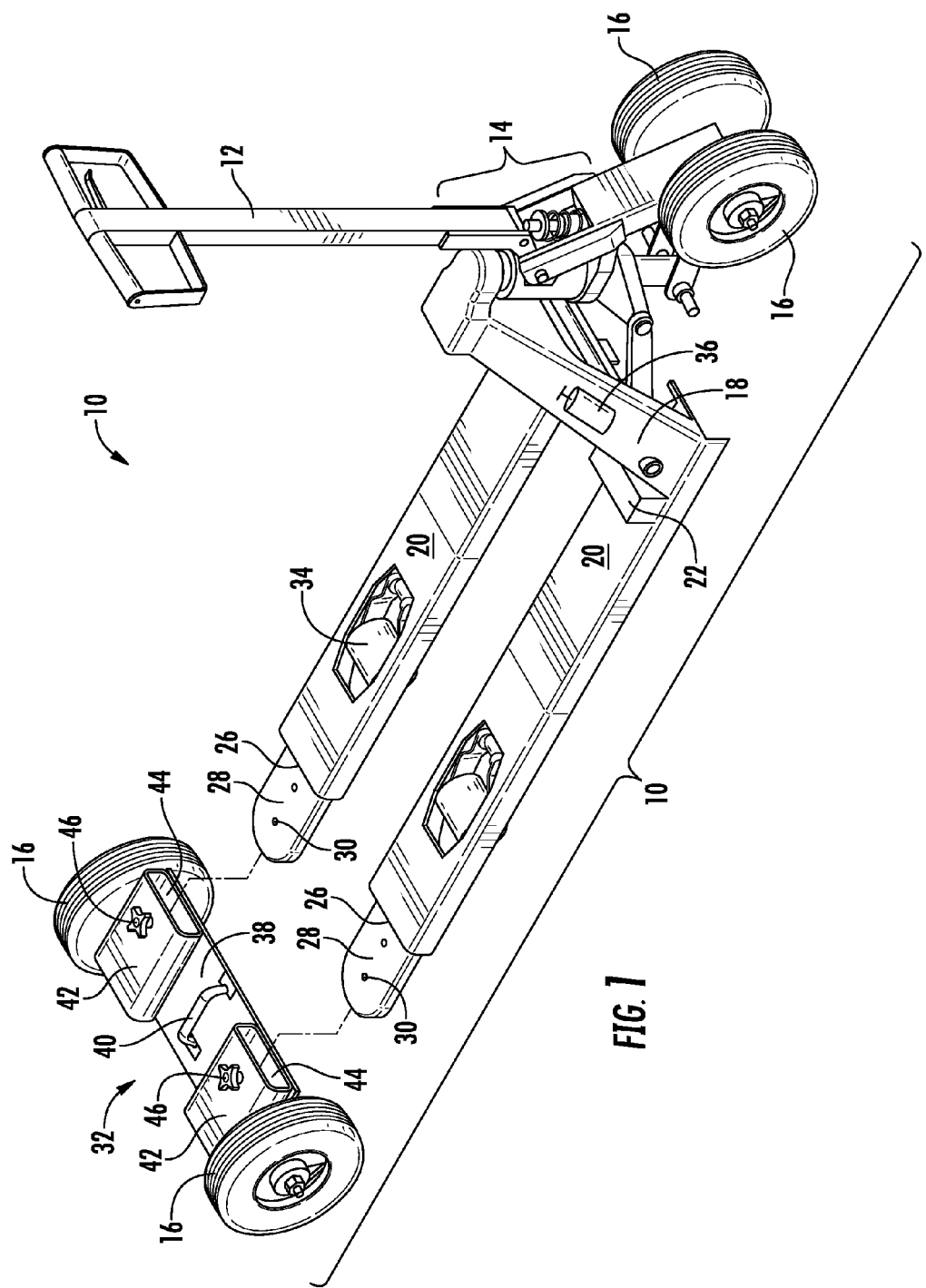
FIG. 1 represents a top perspective view of the present invention showing the dolly separated from the pallet jack tines.

Referring now to the drawings, a Pallet Jack System is presented generally as 10. The Pallet Jack System 10 has a conventional handle 12 that attaches and operates a conventional hydraulic lift mechanism 14 and lift wheel system 34 to raise and lower the laden pallet. The hydraulic lift mechanism 14 has soft wheels 16 attached at the rear under the handle 12 so the operator may steer and move the pallet jack system 10. On the opposite side of the hydraulic lift mechanism 14 is a tine support 18 that supports one or more tines 20 and attaches to the hydraulic lift mechanism 14. Affixed to the surface of the one or more tines 20 at the end affixed to the tine support 18 is a stop block 22 that abuts the tine support 18. When a pallet is placed on the tines 20, it is slid onto the tine 20 until it contacts the stop block 22 which positions the pallet in the ideal position on the tine 20.

Figure 2:
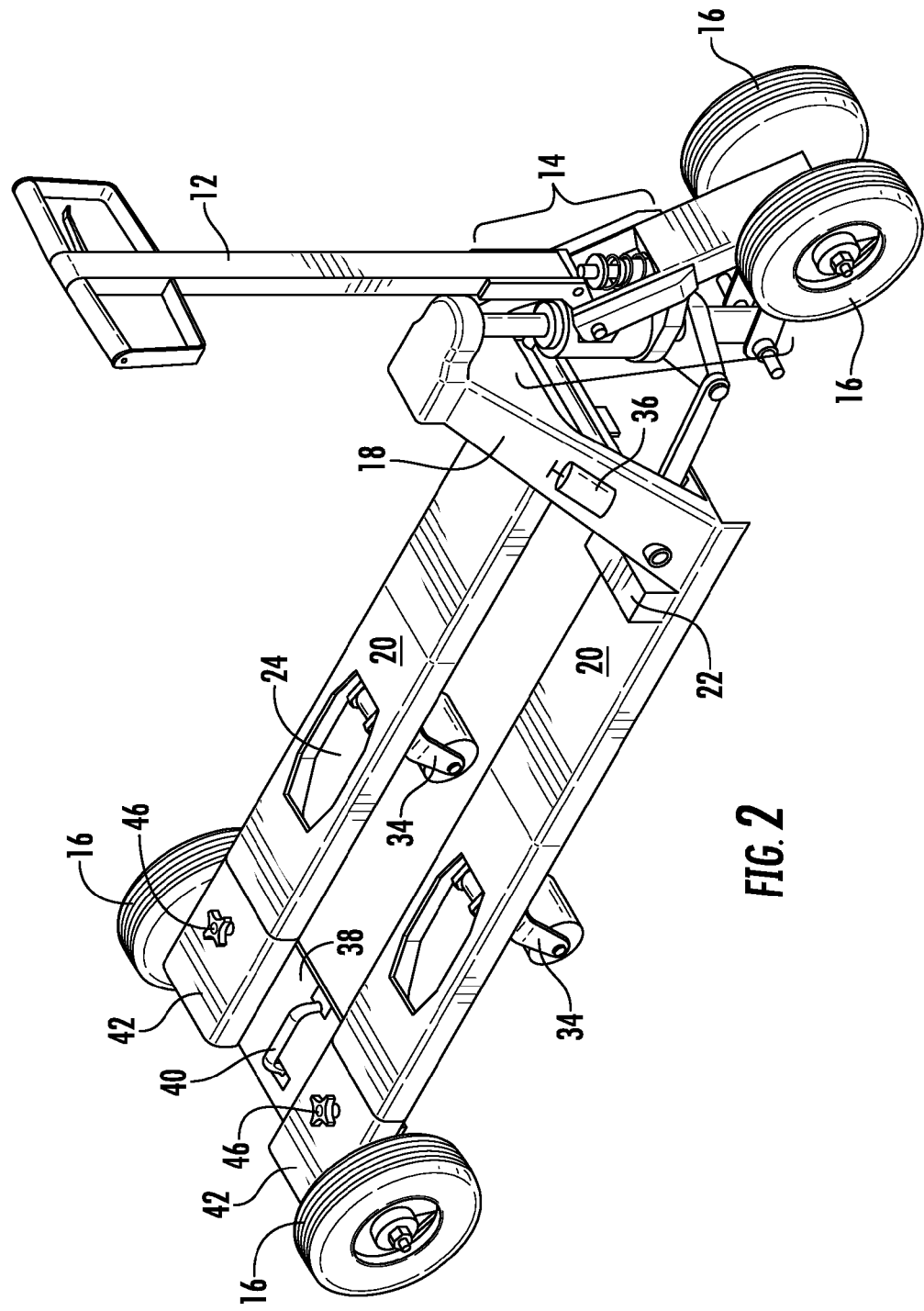
FIG. 2 represents a top perspective view of the present invention showing the dolly engaged with the pallet jack tines as it would be while the invention is being used.
Figure 3:
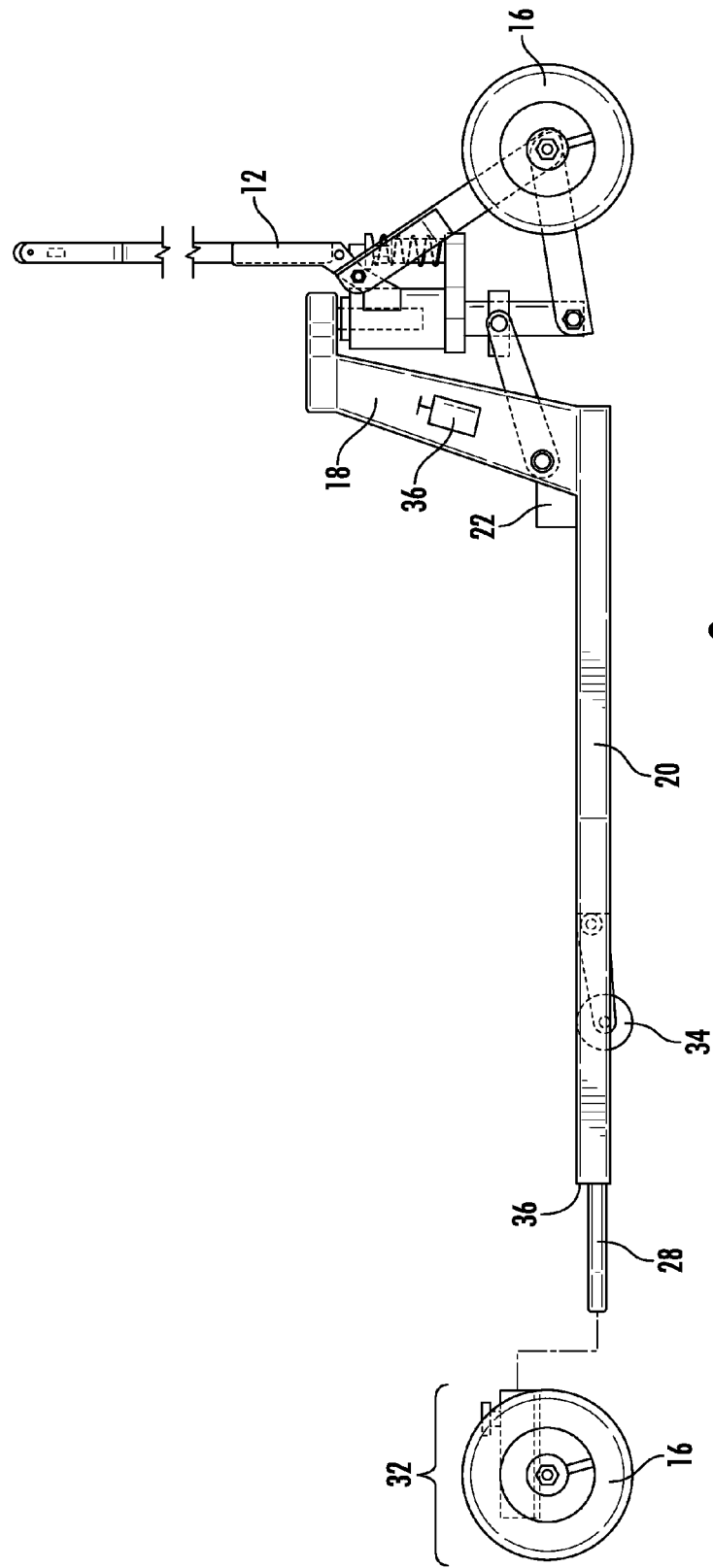
FIG. 3 is a side view of the invention showing the dolly separated from the pallet jack tines.
Figure 4:
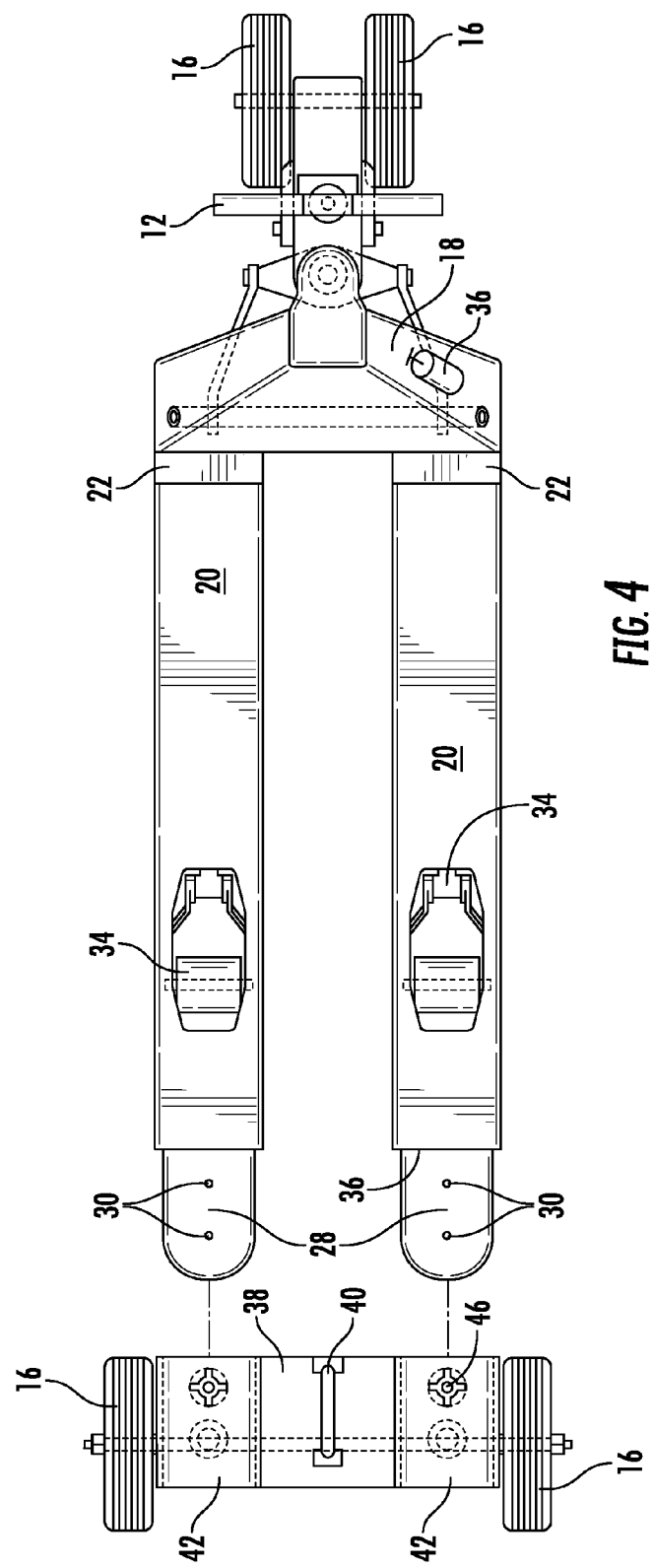
FIG. 4 is a top view of the invention showing the dolly separated from the pallet jack tines.

The tine 20 contains a cavity 24 (easily seen in FIG. 2) located at the opposite end of the tine 20 from the tine support 18 and the stop block 22, positioned just before the tine edge 26. The tine edge 26 is the end of the tine 20 and is configured such that extending from the tine 20 is a dolly support 28 protruding from the tine edge 26. The dolly support 28 is configured so that it can fully support the weight of the pallet just like the tine 20. The dolly support 28 has one or more threaded holes 30 where attachments can be secured. It can be readily appreciated by those in the art that the threaded holes 30 could also simply be pins or other conventional means of fastening an attachment, such as a dolly 32, to the dolly support 28. In the preferred embodiment, however, threaded holes 30 are used.

Housed within the tine cavity 24 is a lift wheel system 34 that is lowered at the same time the tines 20 are raised by the handle 12. Typically, a pallet jack will use the handle to raise and lower both the tines and lift wheel system to ensure that the load remains balanced and does not tip over. In a preferred embodiment of the present invention, there is also provided a manual lift 36 mounted on the tine support 18 such that an operator can manually raise the lift wheel system 34 once the dolly 32 is placed on the tines 20. The lift wheel system 34 can be of any conventional type used in the art and linked to the manual lift 36 via cables (not shown) or other linkage. In the preferred embodiment, the manual lift 36 is a hydraulic lift, but other conventional lift mechanisms can be used, including powered units.

The dolly 32 consists of a base 38 manufactured from a strong material such as steel that is capable of supporting as much weight as the lift wheel system 34 and the tines 20. The dolly 32 optionally is equipped with a dolly handle 40 affixed to the base 38 to aid in moving the dolly 32 from one location to another. Further, the dolly handle 40 assists the user in positioning the dolly 32 for use with the pallet lift system 10. Affixed to the surface of the base 38 is one or more dolly support receptors 42 that are generally in the shape of a flattened cylinder such that the receptor 42 forms a receptor cavity 44 of such a size as to fit around a corresponding dolly support 28. In a preferred embodiment, the receptor 42 is configured to have an opening on the top where a hand screw 46 can be inserted to engage the threaded holes 30 on the dolly support 28 once the dolly support 28 is slid into the receptor cavity 44. This locks the dolly 32 to the tines 20 on the pallet lift system 10 for operation. The dolly 32 also is equipped with soft wheels 16 such that when the dolly 32 is attached to the tines 20 and the pallet jack system 10 is moved, the soft wheels 16 aid in the movement of the pallet lift system 10 and do not damage or mar the surface on which the pallet lift system 10 is moved. It should be appreciated by those skilled in the art that the soft wheels 16 of the dolly 32 can be attached by conventional means, including a single axle, double axle, or the like.

The operation of the present invention can best be appreciated by a detailed description of the parts and their relationship while the pallet lift system 10 is being operated. When a driver arrives at a delivery destination, he retrieves that pallet lift system 10, which includes the dolly 32 and begins to unload the merchandise. Once in the rear of the delivery truck, the driver engages the handle 12 of the pallet lift system 10 and positions the tines 20 to engage the pallet containing the merchandise to be delivered. The driver will slide the tines 20 under the pallet to a point at which the tines 20 are property positioned in the conventional position to lift the pallet. The stop block 22 provides a means to designate exactly how far the driver needs to push the tines 20 under the pallet to ensure that the dolly support 28 can be accessed. Once the tines 20 are in proper position, the driver operates the handle 12 to raise the tines 20 and lower the lift wheel system 34, thereby lifting the pallet off the floor of the truck.

Once the pallet is raised off the floor of the truck, the driver will pull the pallet backwards by the handle 12 and rotate the pallet in order to gain access to the end of the pallet supported by the end of the tines 20 and the lift wheel system 34 near the tine edge 26.

Once the driver has access to the end of the pallet near the tine edge 20, the driver operates the handle 12 to raise the pallet enough so that the dolly 32 can engage the dolly support 28 at the end of the tines 20. The driver takes the dolly handle 40 and positions the dolly 32 on the dolly support 28 by sliding the receptor 42 over the dolly support 28. The driver may need to make adjustments to the height of the pallet by manipulating the handle 12 so that the dolly 32 will easily slide on to the dolly supports 28. The dolly supports 28 slide into the receptor cavity 44 on the dolly 32 such that the front of the receptor 42 will abut against the tine edge 26. This ensures that the dolly 32 is fully engaged with the tines 20 and enables the driver to secure the dolly 32 to the tines 20. The driver engages the hand-screw 46 on the dolly 32 and secures the hand-screw 46 to the threaded holes 30 in the dolly support 28. Once the hand-screw 46 is tightened, the dolly 32 is secured to the tines 20 and will not come off until the hand-screw 46 is loosened.

When the pallet lift system 10 is supporting the weight of the pallet by the tines 20 and the lift wheel system 34, and the dolly 32 is fully secured to the dolly support 28 via the hand-screw 46, the driver can manipulate the manual lift 36 to raise the lift wheel system 34, thereby lowering the pallet and transferring the weight of the pallet from the lift wheel system 34 to the dolly 32. The soft wheels 16 of the dolly 32 absorb the weight and support the pallet. At this point the full weight of the pallet and pallet lift system 10 rests on the soft wheels 16 of the pallet lift system 10.

The driver engages the handle 12 and moves the pallet lift system 10 supporting the pallet and the merchandise to deliver to the end of the truck. Using the truck lift gate or ramp or other means of offloading the pallet lift system 10 from the truck, the driver moves the pallet lift system 10 away from the truck and into the delivery destination. Since the pallet lift system 10 is supporting the full weight of the laden pallet on soft wheels 16, moving the merchandise into the delivery location is easier. The soft wheels 16 not only facilitate the movement of the pallet lift system 10, but prevent damage to the floor of the delivery destination. In addition, if the driver must deliver the merchandise into a location by going over a wood floor or other soft area such as a door jamb or transition, the soft wheels protect the surface and reduce the risk of damaging or marring the floor.

It can be appreciated by those skilled in the art that the pallet lift system 10 can be configured to work with multiple different sizes of pallets. The pallet lift system can use one or more tines 20 and can use soft wheels 16 of different sizes depending on the desired height of the pallet while transporting. It should also be appreciated by those skilled in the art that the pallet lift system 10 can be adapted to be an attachment to existing pallet jacks by use of a slip on attachment for existing pallet tines and replacing the current wheels on an existing pallet jack with soft wheels. Further, it can readily be appreciated that the pallet lift system 10 can be configured to operate with powered movement thereby negating the need for the driver to manually push the pallet lift system 10 to move the merchandise.

The foregoing presents a preferred embodiment of the present invention. The preferred embodiment should not be interpreted to define the limits of the present invention, but rather to enable those skilled in the art to appreciate a preferred embodiment. The present invention is not limited to the described embodiment, and those skilled in the art should appreciate that the present invention can be practiced with varying modifications to the above disclosure without departing from the principles and spirit of the invention. Thus, the present invention is defined and limited by the following claims and their equivalents.

The invention claimed is:

1. A pallet lift system comprising:
a pallet jack and a dolly,
said pallet jack comprising:
 a tine support;
 a tine affixed to said tine support at one end of said tine;
 a dolly support protruding from the opposite end of said tine;
 a cavity located in said tine near the end with said dolly support;
 a lift wheel system affixed in movable relation to said tine and housed in said cavity such that said lift wheel system can extend down from said cavity to contact the ground and continue extending thereby raising said tine;
 a handle, said handle configured to operate said lift wheel system and secured to a conventional hydraulic system, said conventional hydraulic system affixed to said tine support, said handle operating said conventional hydraulic system to lift and lower said lift wheel system and said tine support to raise and lower said tine;
 soft wheels, said soft wheels being connected to said conventional hydraulic system such that said pallet jack is supported by said soft wheels on one end and said lift wheel system on the opposite end, said soft wheels being capable of supporting loads but manufactured from material that will not damage or mar floors;
said dolly comprising:
 a base,
 a receptor affixed to said base forming a receptor cavity configured to accept said dolly support; and
 soft wheels affixed to said base and capable of supporting loads but manufactured from material that will not damage or mar floors.

2. A pallet lift system according to claim 1 further comprising:
a dolly handle affixed to said base;
a hand-screw penetrating through the top of said receptor to engage and secure said dolly support when inserted into said receptor.

3. A pallet lift system according to claim 1 further comprising:
a manual lift affixed to said tine support and configured such that said manual lift operates to raise said lift wheel system once said lift wheel system is no longer under load.

4. A pallet lift system according to claim 1 further comprising:
a block affixed to the end of said tine and abutting said tine support such that said block stops the movement of a pallet when slid onto said tine, thereby positioning the pallet at the ideal location on said tine.

5. A pallet lift system according to claim 1 further comprising:
a plurality of said receptors configured to accept a plurality of tines.

6. A method of moving pallets comprising:
orienting a loaded pallet on a truck such that said loaded pallet can be accessed by a pallet jack, said pallet jack having a tine support, a tine affixed to said tine support at one end of said tine, a dolly support protruding from the opposite end of said tine, a cavity located in said tine near the end with said dolly support, a lift wheel system affixed in movable relation to said tine and housed in said cavity such that said lift wheel system can extend down from said cavity to contact the ground and continue extending thereby raising said tine, a handle, said handle configured to operate said lift wheel system and secured to a conventional hydraulic system, said conventional hydraulic system affixed to said tine support, said handle operating said conventional hydraulic system to lift and lower said lift wheel system and said tine support to raise and lower said tine, soft wheels being connected to said conventional hydraulic system such that said pallet jack is supported by said soft wheels on one end and said lift wheel system on the opposite end, said soft wheels being capable of supporting loads but manufactured from material that will not damage or mar floors;
retrieving said pallet jack and inserting said tines into the pallet to be moved such that the pallet is in a position such that said dolly support protrudes from the pallet;
operating said handle to raise said tine and lower said lift wheel system such that the pallet is raised off the surface of the truck;
moving said pallet jack and pallet so that there is access to the back of the pallet where said dolly support protrudes from the pallet;
retrieving a dolly having a base, a receptor affixed to said base forming a receptor cavity configured to accept said dolly support, and soft wheels affixed to said base and capable of supporting loads but manufactured from material that will not damage or mar floors;
attaching said dolly to said dolly support;
operating said handle to lower said tine and raise said lift wheel system such that the weight of the pallet rests on said soft wheels;
moving said pallet jack loaded with the pallet from the truck into a delivery location;
operating said handle to lower said tine and raise said lift wheel system to transfer the pallet to the surface in the delivery location;
removing said dolly from said dolly support; and
removing said pallet jack from the pallet.

7. The method of claim 6 further comprising the steps of:
operating a manual lift to raise said lift wheel system once said dolly is attached to said dolly support.

8. The method of claim 6 further comprising the step of:
inserting said tine of the pallet lift jack under the loaded pallet until said pallet comes into contact with a stop block affixed to said tine.

* * * * *